(No Model.)
J. W. POWERS.
MEAT PRESERVING DEVICE.
No. 505,126. Patented Sept. 19, 1893.
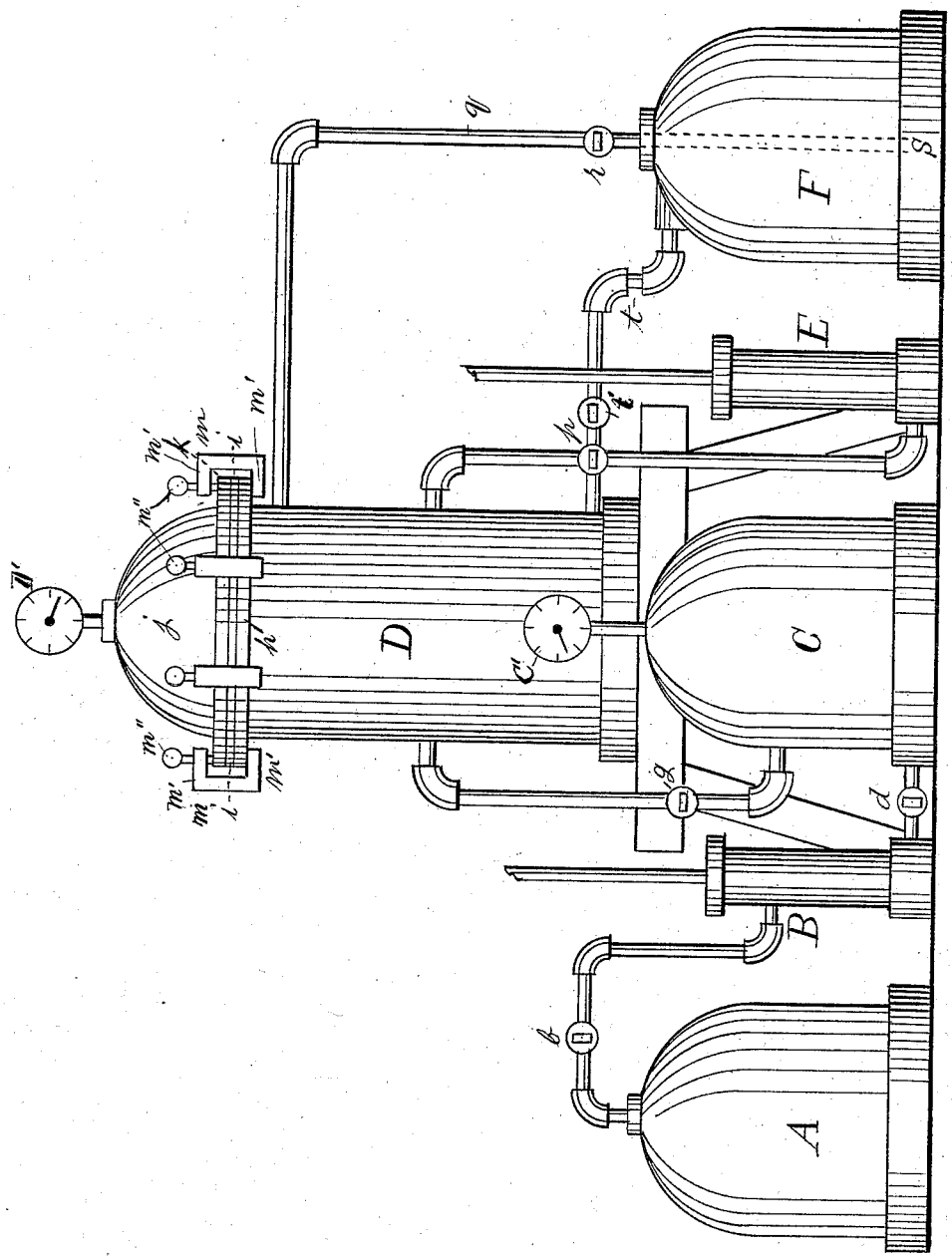
Witnesses
A. H. Bellman
J. P. Lillis
Jay W. Powers
Inventor

UNITED STATES PATENT OFFICE.

JAY W. POWERS, OF CHICAGO, ILLINOIS, ASSIGNOR, BY DIRECT AND MESNE ASSIGNMENTS, TO CHARLES OWEN BROWN, OF SAME PLACE.

MEAT-PRESERVING DEVICE.

SPECIFICATION forming part of Letters Patent No. 505,126, dated September 19, 1893.

Application filed July 17, 1890. Serial No. 359,098. (No model.)

*To all whom it may concern:*

Be it known that I, JAY W. POWERS, a citizen of the United States, residing at Chicago, in the county of Cook and State of Illinois, have invented a new and useful Improvement in Meat-Preserving Devices, of which the following is a specification.

This invention has relation to that class of apparatus used for salting and smoking meat, and its object is to provide a comparatively simple and inexpensive apparatus by the use of which meat may be thoroughly and quickly impregnated with the salting and smoking agents. This object is accomplished by the construction illustrated in the accompanying drawing, which shows in side elevation an apparatus constructed in accordance with my invention.

In the drawing A is a smoke generator, or in case vapor of creosote is to be used, a retort in which such vapor is to be produced.

B is an air compressing pump, which communicates at its receiving side with the generator or retort A, and at its discharge side with a reservoir C, into which the vapors of creosote or smoke may be forced and condensed by such pump.

D is the meat receiver, which is preferably cylindrical in form, and is provided at its open end with a flange $h$. It is further provided with a convex cover $j$, having at its base a flange $k$ similar to said flange $h$. Interposed between said flanges $h$ and $k$ is a packing ring $i$ for making the receiver air tight.

As a means for securing the cover and body portions of the meat receiver together, I have adopted clamps $m$ and thumb screws $m''$, said clamps having inwardly extending flanges $m'$ engaging said flanges $h$ and $k$, and being secured to said latter flanges by said thumb screws.

E designates a vacuum pump which may be of any suitable construction and is operated by any suitable power. This vacuum pump communicates at its receiving side with the meat receiver and is designed to exhaust the air therefrom, and, in so doing, to cause the animal vapors and air in the meat to distend the same, and escape therefrom into the meat receiver, from which it is drawn by the vacuum pump.

F represents a reservoir for the saline solution, which also is connected with the meat receiver D.

Stop cocks or shut off valves are interposed between the retort A and the compressing pump B, between the pump B and the compressed vapor reservoir C, and between said reservoir C and the meat receiver D. $b$, represents the first, $d$, the second, and $g$, the third of these cut off valves. Their purpose is to enable the operator to control the smoke or vapor, first, in the retort, notwithstanding any tension which it may obtain therein, second, in the compressed vapor reservoir C, while it is put under any degree of tension desired and to prevent it from escaping either forwardly toward the meat receiver D otherwise than as it may be required therein, or back toward the compressing pump. A similar stop cock or cut off valve, $p$, is interposed between the vacuum pump E and the receiver D to enable the operator to control the degree of exhaustion produced in the receiver and to hold therein the vapors of creosote or smoke which may be admitted thereinto from the condensed vapor reservoir C. Communication between the solution reservoir F and the meat receiver D is controlled by a cut-off valve $r$.

The mode of operating this apparatus is as follows: After the meat to be cured has been placed in the receiver D, and the same closed so as to be air tight, and the proper saline solution poured into the reservoir F, smoke, or the vapors of creosote, are generated in the generator or retort A. Stop-cocks $b$, $d$ and $p$ are then opened, and compressor B and pump E put into operation. By this means a vacuum or partial vacuum is formed in the receiver D, and the smoke or vapors of creosote are condensed into reservoir C. When said vacuum or partial vacuum is formed in the receiver D, and the reservoir C has a proper supply of highly condensed smoke or the vapors of creosote, stop cocks $d$ and $p$ are closed, the compressor B and pump E stopped, and stop cock $g$ opened. The condensed smoke will then rush into the chamber D to fill the vacuum therein and into the cells or pores of the meat (which has been freed of animal gases during the creation of the vacuum in said chamber) thoroughly permeating said meat and smoking the same. It is essential that during this step of the process there shall be a vacuum or partial vacuum in the receiver D, and that the smoke or vapors of creosote shall have been highly compressed, and I have therefore provided said receiver D with a gage D′, and said reservoir C with a gage C′. The best results will be obtained if the smoke or vapors of creosote are not admitted to the receiver D until the gage D′ registers fourteen pounds or thereabout and pressure gage C′ registers one hundred and fifty pounds or thereabout.

The judgment or experience of the operator may cause him to vary the details of the process more or less, and the creosote vapors may be injected into the receiver D to any desired tension and may be exhausted therefrom and the receiver charged as frequently as desired before the last step in the process, to wit, the admission of the saline solution, is performed. Whenever the meat has been sufficiently exposed to the creosote vapor or smoke to experience the full beneficial effect of such exposure, the valve $g$ will be closed, the vacuum pump set in operation and the valve $r$ opened, admitting the saline solution into the receiver D while the vapors are being exhausted therefrom, and the saline solution will be thus caused to thoroughly saturate and impregnate the meat. So much of the saline solution as is not absorbed by the meat may be drained back into the reservoir F by relieving the vacuum in the meat receiver, which will cause said solution to flow back into the solution reservoir through the pipe $t$ connecting said meat receiver and solution reservoir, and provided with a suitable valve $t'$.

It is obvious that one and the same pipe may be employed for both conducting the saline solution to the meat receiver and back therefrom into the solution reservoir, the pipe in such case entering the lower instead of the upper end of said meat receiver, but in certain instances it may be preferred to discharge the saline solution into the receiver D from the top, and I have therefore provided the separate pipes $q$ and $t$, the former serving for the discharge and entering the upper end of the meat receiver, and the latter serving for the return and extending from the lower end of the said meat receiver. The valve of the pipe $t$ is closed while the meat receiver is being supplied with saline solution. Obviously the saline solution receptacle is open to atmospheric pressure at the top.

It will be understood that the communications between the reservoir C, receiver D, pumps and retort will be made through pipes, the length and form of which are immaterial, in which the several valves $b$, $d$, $g$ and $p$ referred to will be located.

In the description of the operation of my apparatus I have described the smoking of the meat as taking place in advance of the salting thereof. I prefer this order because I believe that by first smoking and then salting the meat it will be more quickly and thoroughly cured than it will be if first salted and then smoked, but it is obvious that the apparatus is equally as well adapted to first salt and finally smoke the meat as it is to first smoke and then salt the same.

Having now described my invention, I claim—

The herein described apparatus for curing meat, consisting of a smoke generator or vapor retort, A, a reservoir C, a pump B, having communication on one side with said generator or retort and on its opposite side with said reservoir, said pump serving to compress the smoke or vapor into said reservoir, an air tight meat receiver, communicating with said vapor or smoke reservoir C, a vacuum pump E communicating with said meat receiver and serving solely to produce a vacuum therein, a saline solution reservoir, means connecting the same with said meat receiver for the discharge of the saline solution into the meat receiver and for draining the same back to the reservoir, gages on said meat receiver and reservoir C, for indicating the degree of vacuum in the former and of compression in the latter, and valves or stop-cocks for regulating communication of the generator or retort with the force pump, of the force pump with reservoir C, of said reservoir with the meat receiver, of the vacuum pump with said meat receiver, and of the solution reservoir with said meat receiver, all substantially as shown and described.

In testimony that I claim the foregoing as my invention I have hereunto subscribed my name in the presence of two witnesses.

JAY W. POWERS.

Witnesses:
A. H. BELLMAN,
J. P. LILLIS.